United States Patent Office 2,790,244
Patented Apr. 30, 1957

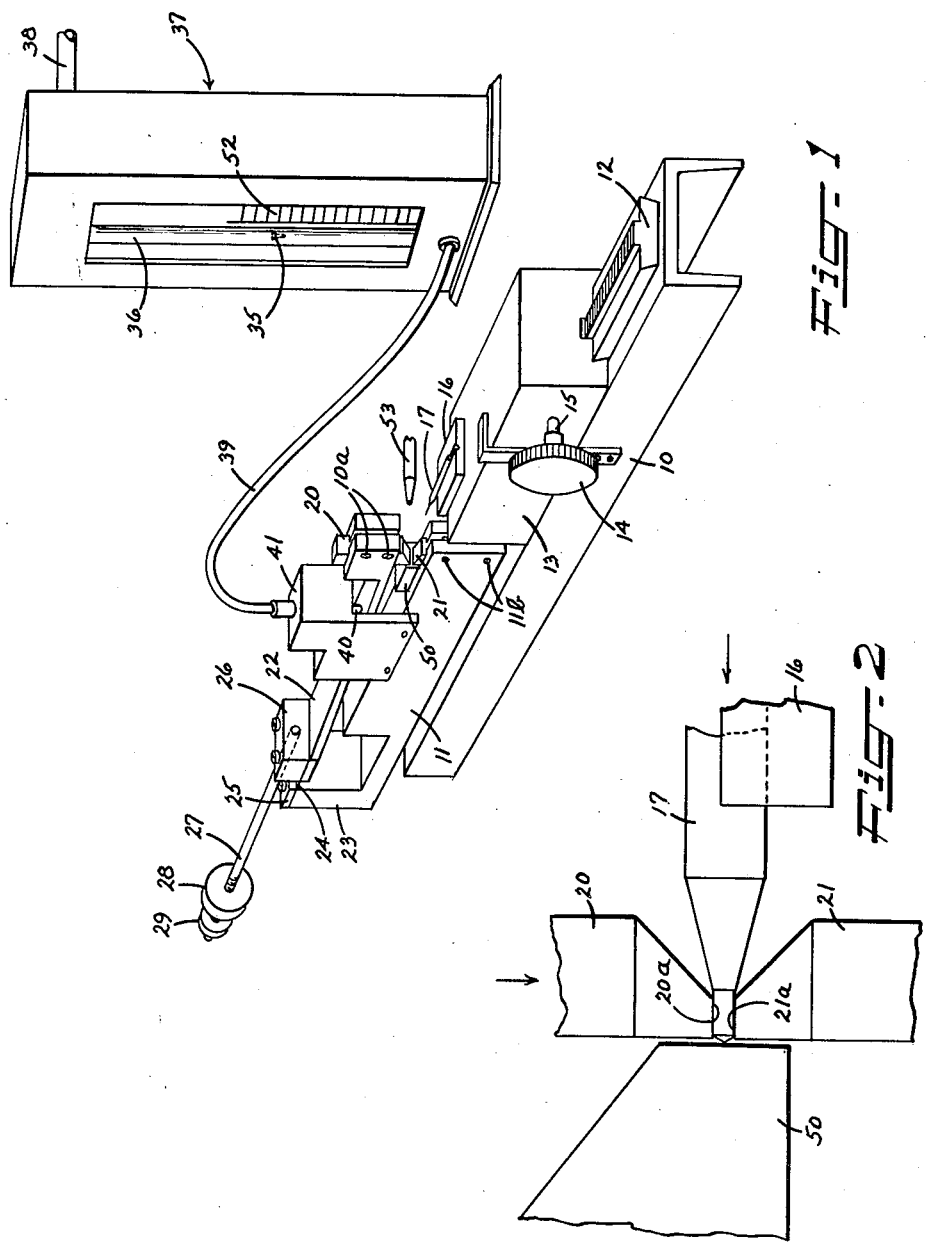
April 30, 1957    W. L. WEBB ET AL    2,790,244
TESTING INSTRUMENT
Filed Oct. 20, 1953    3 Sheets-Sheet 1

2,790,244
TESTING INSTRUMENT

Wesley L. Webb, Blue Mountain Lake, N. Y., and Robert C. Messmer, Chester, Pa., assignors to American Viscose Corporation, Philadelphia, Pa., a corporation of Delaware Application October 20, 1953, Serial No. 387,111

16 Claims. (Cl. 33—147)

This invention relates to measuring and testing apparatus and more particularly to a gauge for accurately checking the size of spinneret punches.

The spinnerets or spinneret plates are punched to provide round orifices through which a fluid such as viscose is extruded to form artificial textile filaments. These holes in the spinnerets are ordinarily round but may be of oblong or other desired shape. An improved spinneret is shown and described in copending application of W. L. Webb, Serial No. 165,785, now issued as Patent No. 2,677,148. In order to make sure that the holes in any particular spinneret are held within the required tolerances, it is necessary to accurately check and sort the punches after they have been fabricated.

Because of the high cost of producing platinum spinnerets, it is most essential to have extremely accurate measurements of the spinneret punches in order that the operator who punches the holes in the spinneret plates can be certain that he is using the punch having the exact measurement called for by the specifications. The range of spinneret punch diameters in current use is 2½ to 7½ thousandths of an inch, and the punch length (punching area) is on the order of 2 thousandths of an inch. Prior methods and apparatus for accurately and rapidly measuring punch diameters as small as ½ to 7½ thousandths of an inch have proved to be unsatisfactory. With methods and apparatus used today for measuring spinneret punches, tolerances may be held to within ±10 micro-inches.

The average life of a spinneret punch as determined by the number of holes it is capable of punching in a spinneret plate is around 400 holes. Some plates contain as many as 6500 holes, so that 15 or 16 punches may be required to make one spinneret. In the present yarn spinning machine there are approximately 100 spinnerets used. In view of the short life of the punch, the number of spinneret plates required per machine, and the required reconditioning and replacement of the plates, the operator's supply of punches is rapidly exhausted. In order to maintain the required flow of punches to the spinneret punching machine operator, considerable pressure has been placed upon the punch checking operators. In the past it has sometimes been necessary to sacrifice accuracy in checking the punches to avoid interruptions in the punching process. All in all, the punch measuring operators find it extremely difficult with the use of present day measuring apparatus to keep the punch machine operators supplied with an adequate quantity of sorted punches.

Many attempts in devising an apparatus for measuring the size of spinneret punches have failed because the measuring units which contact the punch inflict damage upon the punch itself. Any pressure exerted upon the punch may tend to scratch or produce a flat upon the punch, which imperfections render the punch unusable.

Probably the most satisfactory method used heretofore has been one which requires the use of cumbersome and space consuming equipment. The prior system employs a booth large enough to hold a work table with a microscope thereon. A heavy black curtain across the front of the booth prevents light from entering therein. A punch to be measured is placed upon a slide positioned on the slide platform of the microscope and a light beam from a source placed below the slide platform is projected upwardly through the slide and a prism secured to the top of the microscope barrel above the top lens. A measuring chart affixed to a wall of the booth contains a large circle divided into 90° sectors and the horizontal circle diameter line is graduated in proper measuring units. The projection prism is adjusted with reference to the chart so that the image of the punch will be directed upon the chart. The diameter of the punch can be then read from the chart by observing the number of measurement units on the horizontal diameter line which are covered by the punch image. It is therefore apparent that the accuracy of readings in such a system is dependent upon too many variables, not the least one of which is the skill of the operator in focusing the microscope and reading the chart. Experience has shown that individual operators are seldom able to obtain the identical reading for the same punch. When different operators measure the same punch, there is usually a variance due to the difference in measuring techniques of the operators. In addition to the inaccuracy of the method, the process is painstakingly slow since the slide upon the platform and the microscope lenses must continually be adjusted so that the image of the punch will be adequately projected upon the chart.

The present invention is designed to overcome the disadvantages of the above-described prior practice in that it permits punches to be checked at a rate equal to or better than 120 per hour while any human error arising through visual estimation and/or interpolation on the part of the operator is reduced to a minimum.

A further important feature of the present apparatus which distinguishes it from prior gauge type devices lies in the elimination of pressure on the punch during gauging or measuring. The present fixture is designed to provide accurate readings with pressures not greater than one ounce.

In effect, our improved apparatus may be constructed as a complete comparator assembly, a measuring assembly, or it may be employed as a fixture with any type of precision measuring instrument. In production checking of spinneret punches, it is not necessary to obtain an accurate measurement in the sense that the diameter must be determined in fractions of an inch. Therefore, the preferred embodiment described herein is essentially a comparator by which the punches may be sorted into groups of known tolerance variations with respect to the diameter of each punch. Periodically, however, the accuracy of the comparator is checked with a master punch or gauge that has been measured on an accurately calibrated measuring instrument which also utilizes the present invention as a fixture in a manner similar to that employed with the comparator.

It will thus be apparent that the present invention is capable of a wide range of applications for measuring, testing, or checking any element having a thickness on the order of a few micro-inches.

A primary object therefore of the present invention is to provide an extremely simple and accurate fixture for checking at least one dimension of a relatively small article.

A further object of the invention is to provide an extremely accurate comparator for checking rapidly and without damage small articles such as spinneret jet punches.

A further object of the invention is to provide an accurate master measuring fixture for spinneret jet punches and the like.

A still further object of the invention is to provide in a dimension calculating fixture, a pair of anvils movable with respect to each other, a carriage for holding the work piece and positioned to insert the work piece between the anvils when they are opened, and sensitive detecting means for reading movement of one of the anvils when contacting the piece to be measured.

A still further object of the invention is to provide in delicate accurate measuring apparatus a cantilever mounted platform which supports a measuring anvil, said platform being supported by a flexible reed, a stationary anvil in registry with said measuring anvil, and means for detecting minute displacements of the reed supported platform and measuring anvil.

Another object of the invention is to provide an accurate fixture for measuring minute objects having a cantilever mounted platform supported by a flexible reed, a measuring surface supported on said platform, a stationary measuring surface in registry with said first-mentioned surface, and a fluid jet directed against said platform, the fluid flow from the jet being responsive to displacement of the reed supported platform with respect to the jet.

A further object is to provide in apparatus of the type described herein a parallel support for the cantilever mounted platform to provide absolute straight line movement therefor.

Further objects will be apparent from the specification and drawings in which:

Figure 1 is a perspective showing one form of the present invention used as a comparator;

Figure 2 is an enlarged schematic detail showing a spinneret jet punch engaged in position between the anvils of the structure of Figure 1;

Figure 3:
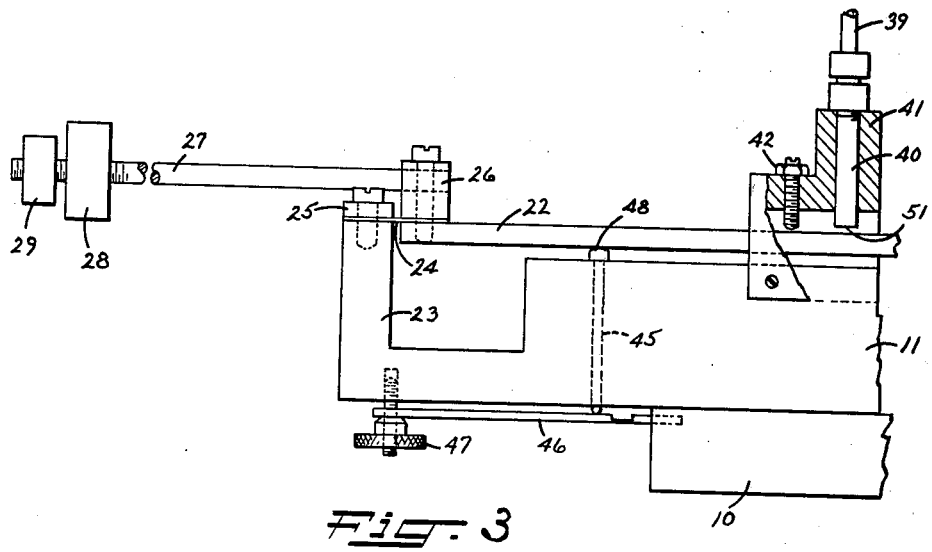
Figure 3 is an enlarged fragmentary detail, partially sectioned, of the platform assembly used in the apparatus of Figure 1.

Referring now more particularly to Figures 1 and 3, a comparator constructed in accordance with the present invention which may be employed to obtain readings on jet punches comprises a base 10 to which an anvil bracket 11 is secured at one end, and to which a dovetailed rack 12 is secured at the other end. A carriage 13 slides along and over rack 12 under control of knob 14 and a shaft 15 provided with a suitable pinion (not shown) in mesh with the rack 12. The upper forward surface of carriage 13 has a punch holder 16 mounted thereon and the holder is grooved to receive a jet punch 17 and to accurately position the punch with respect to the vertical distance from the base 10 and in alignment with the path of travel of the carriage.

The mechanism for measuring the punches 17 consists of a pair of anvils 20 and 21, upper anvil 20 being adjustably clamped at one end of a cantilever mounted platform 22 and the lower anvil 21 being adjustably clamped in the forward end of bracket 11. The outer end of bracket 11 overhangs base 10 and has a flange or post 23 to the upper surface of which a reed 24 is rigidly secured by means of a clamp plate 25. The opposite end of reed 24 is securely clamped between platform 22 and a block 26. This provides limited flexible support for the platform in a vertical plane. The weight of the upper anvil 20 as well as the platform itself is counterbalanced by means of a shaft 27 mounted in block 26 and adjustably supporting one or more counterweights 28 and 29.

Vertical movement of the platform 22 and upper anvil 20 is indicated by the position of a float 35 which moves freely in a column 36 in indicator 37. The indicator has an air inlet 38 and is connected by conduit 39 to a nozzle 40 (Figure 3) supported to direct a blast of air or gas downwardly upon the top of platform 22. The float type indicating device 37 is well-known and available on the market. Such an indicator, useful in connection with the apparatus of Figure 1, is manufactured and sold by the Sheffield Corporation of Dayton, Ohio, under the name "Column Precisionaire." The nozzle 40 is positioned over platform 22 in an inverted U-shaped bracket 41 which also is provided with a limit stop 42 (Figure 3) for controlling upward movement of platform 22.

In operation, an article to be measured, such as a jet punch 17 is placed on the punch holder 16. The cantilever mounted platform 22 is raised to open the gap between anvil faces 20a and 21a by a lifting pin 45 (Figure 3), movable in bracket 11 by means of a lever 46 and adjusting nut 47 for the lever. The head 48 of pin 45 is of sufficient thickness to prevent the platform 22 from swinging downwardly so far that the faces 20a and 21a (Figure 2) touch each other. With the anvils 20 and 21 separated by means of a partial turn of nut 47, the operator advances carriage 13 by turning knob 14 to position the punch 17 between the anvil faces 20a and 21a and up against the stop 50. Since the punch merely rests in the groove of holder 16, it is not damaged when the tip of the punch contacts stop 50. Should it become necessary to otherwise control the horizontal position of the object to be measured, a magnetized holder 16 would be employed. In this event the stop 50 could be eliminated in favor of an abutment on the holder 16 or carriage 13. The depth of the groove in holder 16 is carefully controlled so that the tip of the punch always rests on the upper face 21a of lower anvil 21. When the punch is in position, the operator turns nut 47 in the opposite direction to lower the platform 22, thus permitting the upper anvil 20 to contact the punch 17 as shown in Figure 2. The distance between the upper surface of platform 22 and nozzle 40 at 51 (Figure 3) controls the volume of air which flows from the nozzle. This in turn controls the position of float 35 in column 36, thus enabling the operator to obtain a reading on scale 52.

The anvil faces 20a and 21a are maintained free from dust and dirt by means of a fluid blast directed at the anvils from a nozzle 53.

Figure 4:
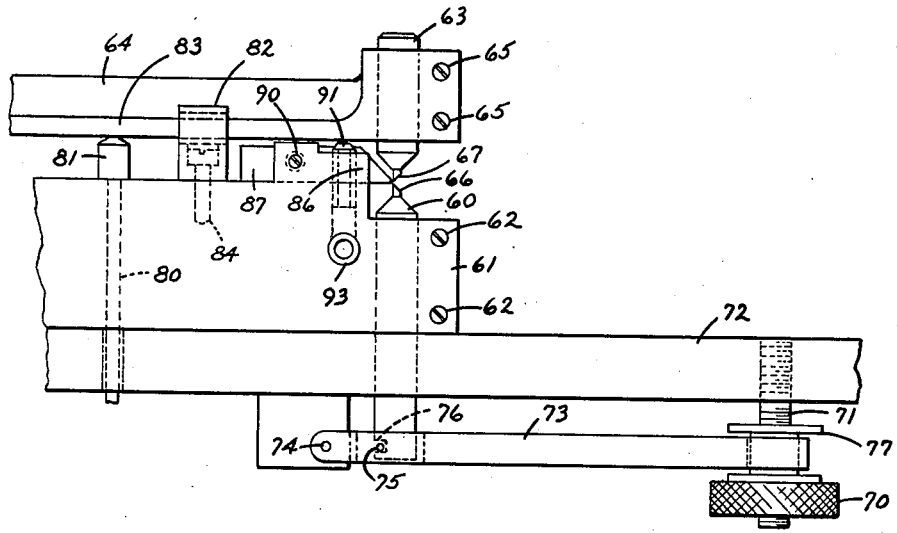
Figure 4 is an enlarged detail of a preferred form of comparator similar to the showing of Figure 3.
Figure 5:
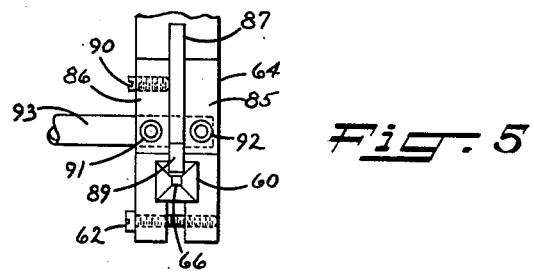
Figure 5 is an enlarged fragmentary detail of the air jets of the structure of Figure 4.
Figure 6:
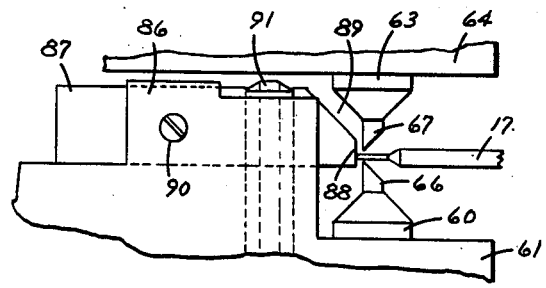
Figure 6 is an enlarged fragmentary detail showing the anvils and stop of the structure of Figure 4.

Referring now to Figures 4–6, a preferred form of the invention intended primarily for use as a comparator and having various refinements over the structure of Figures 1 and 3 will be described. The lower anvil 60 is clamped in bracket 61 by means of screws 62, 62 whereas the upper anvil 63 is clamped in the platform 64 by means of screws 65, 65. The anvil tip or face 66 is preferably a carbide insert secured to the lower anvil member 60, and the upper anvil tip 67 is also of a relatively hard material, such as carbide, secured in the upper anvil 63. The tips 66 and 67 are carefully ground and lapped to the shape shown in the highly enlarged details of Figures 2 and 6. The lower anvil member 60 can be adjusted accurately by loosening screws 62, 62 and turning the adjusting nut 70 threaded on a stud 71 secured in the base 72. An arm 73 pivoted at 74 controls vertical movement of the anvil 60 through a pin 75 fitting in slot 76 near the bottom of the anvil. The opposite end of the lever 73 is retained in an annular groove formed on an extension 77 of nut 70. This construction enables the distance between the anvil faces to be quickly and accurately adjusted to accommodate objects of different size.

The raising pin 80 is provided with an enlarged head 81 which limits the extreme lowered position of platform 64 in the same manner that has been described in conjunction with raising pin 45 in the structure of Figure 3. A bracket 82 having a T-shaped slot is fitted around oppositely extending lateral flanges on platform 64. One of these flanges is shown in Figure 4 at 83. The T-slot in bracket 82 is of sufficient depth to permit limited vertical movement of the platform and at the same time providing an upper limit stop for the platform. The bracket 82 may be secured by means of a cap screw 84. The anvil bracket 61 is provided with a pair of raised ears 85 and 86 which form therebetween a slot to retain the stop 87. This stop has a flat nose 88 (Figure 6) and is chamfered at 89 to provide clearance for the upper anvil member 63. Stop 87 is adjustably retained between ears 85 and 86 by means of a set screw 90.

In the form of Figure 4 the stream of air or other gas used for measuring the distance between anvils 66 and 67 is directed through a pair of nozzles 91 and 92 in ears 85 and 86 so that the nozzles straddle the stop 87. The anvil bracket 61 is drilled to provide fluid communication with nozzles 91 and 92 and the air supply line 93. The top surfaces of ears 85 and 86 are milled horizontally in line with nozzles 91 and 92, and the termini of the nozzles are also chamfered to provide adequate clearance for the exhaust air, thus avoiding the introduction of errors which would otherwise be present due to the build up of pressure underneath the platform. Furthermore, by locating the nozzles 91 and 92 close to the anvils, it is possible to utilize the exhaust air to maintain the anvil faces clean. This avoids the necessity for providing an independent jet of air such as shown at 53 in Figure 1. In other respects the fixture of Figure 4 is similar to that shown in Figures 1 and 3.

Figure 7:
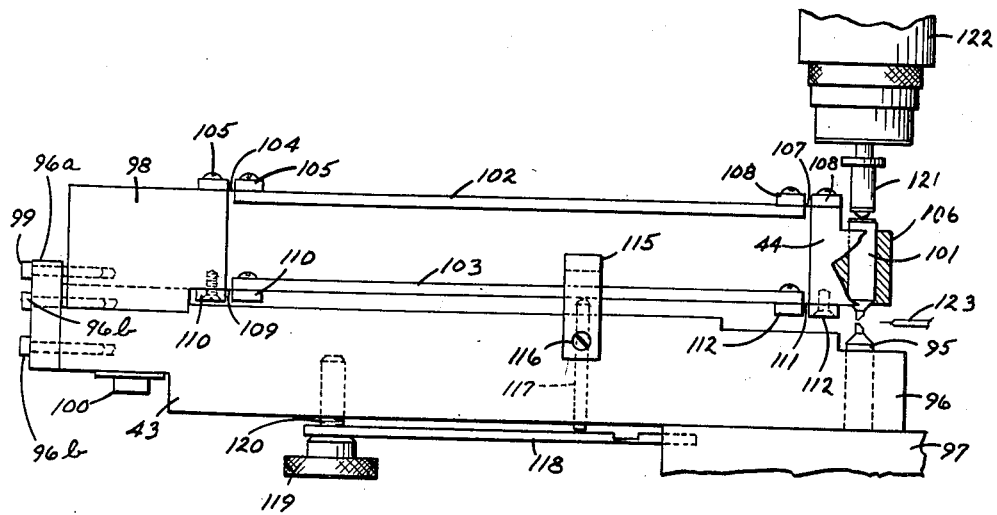
Figure 7 is a partially sectioned view of a modification used in conjunction with a different type of indicating device.

Depending upon the accuracy of readings required and the type of indicating device used, the fixtures of Figures 1 and 4 may be used either as comparators or actual measuring instruments. It will be noted, however, that certain error is introduced due to the arcuate path of travel of the platform and upper anvil. If extreme accuracy is required in obtaining actual measurements, a correction would therefore be necessary for maximum and minimum readings. Figure 7 illustrates a variation of the invention which eliminates error due to the arcuate travel of the platform. This more accurate but more expensive form is used to calibrate a master gauge or punch that may be used to check periodically a large number of the single platform type fixtures.

Referring to Figure 7, the lower anvil 95 is secured in the anvil bracket 96 which is in turn supported on the base member 97. Anvil bracket 106 overhangs base 97 and is provided at its outer extremity with a movable flange or block 98 adjustable on the anvil bracket 96 by means of adjusting screw 99 and lock screw 100. A plate 96a carrying adjusting screw 99 is secured to bracket 96 by screws 96b, 96b. A double cantilever mounted platform support for the upper anvil 101 comprises an upper link 102 and a lower link 103 of equal length. The upper link is connected to the block 98 through a flexible reed 104 secured to the block and the link by means of clamp plates 105, 105. The opposite end of link 102 is connected to upper anvil holder 106 by a flexible reed 107 and clamp plates 108, 108. In a similar fashion the lower link 103 is connected to block 98 by flexible reed 109 and clamp plates 110, 110 and to anvil holder 106 by reed 111 and clamp plates 112, 112. Due to the parallelogram linkage, it will be apparent that straight line movement of anvil holder 106 and, consequently, anvil 101 is thereby obtained. Inverted U-shaped bracket 115 is secured to the lower anvil bracket 96 by means of screw 116, and in such a manner that upper vertical movement of the parallelogram type platform is limited. The platform can be raised as a unit through the raising pin 117 which is actuated through a lever arm 118 controlled by a nut 119 on stud 120.

For obtaining extremely accurate measurements on the order of a millionth of an inch, an optical instrument of the prismatic type may be employed. Such a device is manufactured and sold by E. Leitz of Wetzlar, Germany and called "Ultra-Projectometer." The nose of the Leitz instrument is indicated at 121 directly contacting the top of anvil 101 and the barrel 122 of the instrument is shown fragmentarily. Since this device forms no part of the present invention and is available on the market, further description thereof is believed unnecessary.

The operation of the fixture of Figure 7 is substantially the same as that previously described in connection with Figures 1 and 4. The operator raises the double platform to separate anvils 95 and 101 by means of a partial turn of nut 119. The punch or master gauge 123 is then inserted between the anvil tips, and the actual dimension of the punch may be read directly on the Leitz instrument. The cost and delicacy of this measuring equipment, however, prohibits its use by unskilled operators outside of a control laboratory. An important feature of the present invention, and particularly the construction of Figures 4 to 6, resides in the ability to obtain very accurate results with comparatively simple and inexpensive equipment. Such a procedure is a requirement for the processing of many objects in the numbers required for maintaining an adequate supply of spinneret punches. The provision of a flexible reed which eliminates any friction in the support for the movable platform is extremely desirable and is, therefore, another important feature of the present invention.

It will thus be understood that the present invention provides a simple inexpensive but accurate device for the high speed checking of very small objects such as spinneret punches. Human error is reduced to a minimum, thus greatly increasing overall efficiency and accuracy. Production can be doubled or tripled without increasing tolerances or percentage of rejects. The invention also provides means for maintaining extremely accurate control by using a single master measuring unit in connection with a large number of production units.

We claim:

1. An apparatus for measuring the diameter of a spinneret punch comprising a primary support, a secondary support mounted on one end portion of the primary support, a counterbalanced cantilever mounted element extending over and along the top surface of the secondary support, a first measuring unit mounted on the element, a second measuring unit mounted in the secondary support so as to be in cooperating relationship with the first unit, a carriage mounted adjacent the opposite end of the primary support which is adapted to move the punch into measuring position between the two units, and an indicator activated by the raising of the first unit for indicating the diameter measurement of the punch.

2. An apparatus for measuring the diameter of a spinneret punch comprising a primary support, a secondary support mounted on one end portion of the primary support, a counterbalanced cantilever mounted rigid platform extending over and along the top surface of the secondary support, a first measuring unit mounted on the platform, a second measuring unit mounted in the secondary support so as to be in cooperating relationship with the first unit, a carriage mounted adjacent the opposite end of the primary support which is adapted to move the punch into measuring position between the two units, and an indicator activated by the raising of the first unit for indicating the diameter measurement of the punch.

3. An apparatus for measuring the diameter of a spinneret punch comprising a primary support, a secondary support mounted on one end portion of the primary support, a counterbalanced cantilever mounted platform extending over and along the top surface of the secondary support, a first measuring unit mounted on the platform, a second measuring unit mounted in the secondary support in vertical alignment with the first unit, a carriage mounted adjacent the opposite end of the primary support which is adapted to move the punch into measuring position between the two measuring units, and a gas blast measuring system activated by the raising of the platform for indicating the diameter measurement of the punch.

4. An apparatus for measuring the diameter of a spinneret punch comprising a primary support, a secondary support mounted on one end portion of the primary support, a counterbalanced cantilever mounted platform extending over and along the top surface of the secondary support, a first measuring unit mounted on the platform, a second measuring unit mounted in the secondary support in vertical alignment with the first unit, a carriage mounted adjacent the opposite end of the primary support which is adapted to move the punch into measuring position between the two measuring units, a gas blast nozzle mounted on the secondary support and directed against the top surface of the platform, and an indicator connected with the nozzle for indicating the diameter measurement of the punch, said indicator being activated by the raising of the platform.

5. An apparatus for measuring the diameter of a spinneret punch comprising a primary support, a secondary support mounted on one end portion of the primary support, a counterbalanced cantilever mounted platform extending over and along the top surface of the secondary support, an upper measuring unit mounted on the platform, a lower measuring unit mounted in the secondary support in vertical alignment with the upper unit, a carriage mounted adjacent the opposite end of the primary support which is adapted to move the punch into measuring position between the two measuring units, a gas blast nozzle extending upwardly through the top surface of the secondary support so as to be directed against the bottom surface of the platform, and an indicator connected with the nozzle for indicating the diameter measurement of the punch, said indicator being activated by the raising of the platform.

6. An apparatus for measuring the diameter of a spinneret punch comprising a primary support, a secondary support mounted on one end portion of the primary support, a counterbalanced cantilever mounted platform extending over and along the top surface of the secondary support, an upper measuring unit mounted on the platform, a lower measuring unit mounted in the secondary support in vertical alignment with the upper unit, a carriage mounted adjacent the opposite end of the primary support which is adapted to move the punch into measuring position between the two measuring units, two air blast nozzles extending upwardly through the top surface of the secondary support so as to be directed against each side portion of the bottom surface of the platform, and an indicator connected with the nozzles for indicating the diameter measurement of the punch, said indicator being activated by the raising of the platform.

7. An apparatus for measuring the diameter of a spinneret punch comprising a primary support, a secondary support mounted on one end portion of the primary support, a counterbalanced cantilever mounted platform extending over and along the top surface of the secondary support, an upper anvil retainer on the platform, an upper measuring unit mounted in the retainer, a lower measuring unit mounted in the secondary support in vertical alignment with the upper unit, a carriage mounted adjacent the opposite end of the primary support which is adapted to move the punch into measuring position between the two measuring units, and an optical projector indicator activated by the raising of the upper measuring unit for indicating the diameter measurement of the punch.

8. An apparatus for measuring the diameter of a spinneret punch comprising a primary support, a secondary support mounted on one end portion of the primary support, a counterbalanced cantilever mounted platform extending over and along the top surface of the secondary support, an upper measuring anvil vertically mounted on the platform, a lower measuring unit vertically mounted in the secondary support in vertical alignment with the upper unit, a carriage mounted adjacent the opposite end of the primary support which is adapted to move the punch into measuring position between the two measuring units, and an indicator activated by the raising of the upper anvil for indicating the diameter measurement of the punch.

9. An apparatus for measuring the diameter of a spinneret punch comprising a primary support, a secondary support mounted on one end portion of the primary support, a counterbalanced cantilever mounted platform extending over and along the top surface of the secondary support, an upper measuring anvil vertically mounted on the platform, a lower measuring anvil vertically mounted on the secondary support below the first anvil so that the tip of the upper anvil is in vertical alignment with the tip of the lower anvil, a carriage mounted adjacent the opposite end of the primary support which is adapted to move the punch into measuring position between the two measuring units, and an indicator activated by the raising of the upper anvil for indicating the diameter measurement of the punch.

10. An apparatus for measuring the diameter of a spinneret punch comprising a primary support, a secondary support mounted on one end portion of the primary support, a counterbalanced cantilever mounted platform extending over and along the top surface of the secondary support, an upper measuring unit mounted on the platform, a lower measuring unit mounted in the secondary support so as to be in cooperating relationship with the upper unit, a carriage mounted adjacent the opposite end of the primary support which is adapted to move the punch into measuring position between the two measuring units, a raising device for raising the platform prior to the introduction of the punch between the measuring units, and an indicator activated by raising of the upper measuring unit for indicating the diameter measurement of the punch.

11. An apparatus for measuring the diameter of a spinneret punch comprising a primary support, a secondary support mounted on one end portion of the primary support, a counterbalanced cantilever mounted platform extending over and along the top surface of the secondary support, an upper measuring anvil vertically mounted on the platform, a lower measuring anvil vertically mounted on the secondary support below the upper anvil so that the tip of the upper anvil is in vertical alignment with the tip of the lower anvil, an adjusting device for vertically adjusting the position of the lower measuring anvil, a carriage mounted adjacent the opposite end of the primary support which is adapted to move the punch into measuring position between the two measuring units, and an indicator activated by the raising of the upper measuring anvil for indicating the diameter measurement of the punch.

12. An apparatus for measuring the diameter of a spinneret punch according to claim 1 comprising an air nozzle positioned so as to be directed against the tips of the cooperating measuring anvils to maintain the tips clear of lint and dust.

13. An apparatus for measuring the diameter of a spinneret punch according to claim 7 comprising two parallel platforms adapted to be raised and mounted one above the other in spaced relationship to the upper anvil retainer and to a mounting secured to the secondary support.

14. A fixture for use in conjunction with apparatus for obtaining accurate dimensional readings of a relatively small object comprising a pair of aligned object contacting anvils movable with respect to each other, a counterbalanced cantilever mounted platform upon which at least one of said anvils is supported, and means for separating the object contacting surfaces of said anvils.

15. A fixture for positioning and testing relatively small objects comprising a pair of aligned object contacting anvils movable with respect to each other, a counterbalanced cantilever mounted platform upon which at least one of said anvils is supported, means for separating the object contacting surfaces of said anvils, and means for advancing an object between said separated surfaces.

16. An apparatus for obtaining accurate dimensional readings on opposed surfaces of a relatively small object comprising a pair of aligned object contacting anvils movable with respect to each other, a counterbalanced cantilever mounted platform upon which at least one of said anvils is supported, means for separating the object contacting surfaces of said anvils, means for advancing an object between said separated surfaces, and means responsive to flexing of said platform for indicating the extent of separation of the anvils.

References Cited in the file of this patent

UNITED STATES PATENTS

| | | |
|---|---|---|
| 2,190,306 | Balsiger | Feb. 13, 1940 |
| 2,356,274 | Roger | Aug. 22, 1944 |
| 2,470,004 | Trame | May 10, 1949 |
| 2,608,767 | Hall | Sept. 2, 1952 |

FOREIGN PATENTS

| | | |
|---|---|---|
| 557,578 | Great Britain | Nov. 26, 1943 |